United States Patent
Jung

(10) Patent No.: US 9,433,961 B2
(45) Date of Patent: Sep. 6, 2016

(54) APPARATUS AND METHOD OF SPRAYING VEHICLE WASHER LIQUID

(71) Applicant: Hyundai Motor Company, Seoul (KR)

(72) Inventor: Soon Young Jung, Daegu (KR)

(73) Assignee: Hyundai Motor Company, Seoul (KR)

( * ) Notice: Subject to any disclaimer, the term of this patent is extended or adjusted under 35 U.S.C. 154(b) by 707 days.

(21) Appl. No.: 13/691,392

(22) Filed: Nov. 30, 2012

(65) Prior Publication Data

US 2014/0097265 A1    Apr. 10, 2014

(30) Foreign Application Priority Data

Oct. 8, 2012    (KR) .................. 10-2012-0111246

(51) Int. Cl.
  *B60S 1/48*   (2006.01)
  *B05B 12/00*  (2006.01)
  *B60J 7/057*  (2006.01)

(52) U.S. Cl.
  CPC ............ *B05B 12/004* (2013.01); *B60J 7/0573* (2013.01); *B60S 1/481* (2013.01)

(58) Field of Classification Search
  CPC .......... B60S 1/46; B60S 1/52; B60S 1/0862; B60S 1/48; B60S 1/381; B60S 1/486; B60J 7/043; B60J 7/057; B60J 7/02; B60J 7/04; B60J 7/0573; B05B 12/00; B05B 12/004

USPC ......................... 239/284.1, 67, 69
See application file for complete search history.

(56) References Cited

U.S. PATENT DOCUMENTS

2015/0030462 A1*   1/2015   Boekenkamp .......... B60S 1/486
                                                            417/14

FOREIGN PATENT DOCUMENTS

| JP | 6247149 A | 9/1994 |
| KP | 1999-0034869 | 5/1999 |
| KR | 10-1997-0065236 | 10/1997 |
| KR | 10-1999-0053549 | 7/1999 |
| KR | 2003-0040960 A | 5/2003 |
| KR | 10-0500821 | 7/2005 |
| KR | 2007-0117265 A | 12/2007 |
| KR | 2009-0112353 A | 10/2009 |

* cited by examiner

*Primary Examiner* — Christopher Kim
(74) *Attorney, Agent, or Firm* — Mintz Levin Cohn Ferris Glovsky and Popeo, P.C.; Peter F. Corless

(57) ABSTRACT

Disclosed herein are a washer liquid spraying apparatus and method of a vehicle in which pressure of a sprayed washer liquid is reduced when a washer liquid spraying signal is input in the state in which a sun roof is opened, thereby preventing a washer liquid from spraying into the vehicle through the sun roof, and the reduced pressure of the sprayed washer liquid returns to an original state when the sun roof is closed.

3 Claims, 3 Drawing Sheets

APPARATUS AND METHOD OF SPRAYING VEHICLE WASHER LIQUID

CROSS-REFERENCE TO RELATED APPLICATION

This application is based on and claims priority from Korean Patent Application No. 10-2012-0111246, filed on Oct. 8, 2012 in the Korean Intellectual Property Office, the disclosure of which is incorporated herein in its entirety by reference.

BACKGROUND OF THE INVENTION

1. Field of the invention

The present invention relates to an apparatus and method of spraying vehicle washer liquid, and more particularly, to a vehicle apparatus and method for spraying vehicle washer liquid in which a washer liquid is sprayed according to a state of the vehicle.

2. Description of the Prior Art

Generally, a vehicle is provided with a wiper for removing foreign materials positioned on a surface of a wind shield glass, particularly, for wiping rainwater on the surface of the wind shield glass in rainy weather to increase visibility through the wind shield glass for a driver.

The wiper apparatus may be configured so that rotational movement generated in a wiper motor is transferred to a wiper arm through a wiper linkage system and a water plate is horizontally reciprocated in a predetermined wiping section by the wiper arm to wipe the wind shield glass.

Additionally, the vehicle may be provided with a washer liquid spraying apparatus spraying a washer liquid to the surface of the wind shield glass so the foreign materials may be more easily removed in a process of cleaning the surface of the wind shield glass. The washer liquid spraying apparatus may be configured so the washer liquid stored in a washer liquid storing tank is pumped to a spraying nozzle by a pumping force generated by a washer liquid spraying motor and is sprayed by the spraying nozzle.

The washer liquid spraying apparatus according to the related art as described above may drive the washer liquid spraying motor according to a spraying signal from a multi-function switch to spray the washer liquid stored in the washer liquid storing tank to the wind shield glass.

Furthermore, when the driver operates the multi-function switch without recognizing an open sun roof of the vehicle, the washer liquid may spray into the vehicle.

SUMMARY OF THE INVENTION

Accordingly, the present invention has been made to solve the above-mentioned problems occurring in the prior art while advantages achieved by the prior art are maintained intact.

The present invention provides an apparatus and method for spraying a vehicle washer liquid in which pressure of a sprayed washer liquid may be reduced when a washer liquid spraying signal is input by a user when a sun roof is opened, thereby preventing washer liquid from spraying into the vehicle through the sun roof and the reduced pressure of the sprayed washer liquid may increase when the sun roof is closed.

One embodiment of the present invention provides a washer liquid spraying apparatus of a vehicle, including a plurality of units executed by a controller. The plurality of units may include: a sun roof monitoring unit monitoring an operation state of a sun roof mounted in the vehicle; a spraying signal inputting unit receiving a washer liquid spraying signal input from a driver; and a washer liquid spraying unit spraying a washer liquid.

Another embodiment of the present invention provides a washer liquid spraying method of a vehicle, including: monitoring, by a controller, an operation state of a sun roof mounted in the vehicle; receiving, by the controller, a washer liquid spraying signal input from a driver; controlling, by the controller, pressure of a washer liquid when the sun roof is opened; and executing, by the controller, a spray of the washer liquid according to determined pressure.

BRIEF DESCRIPTION OF THE DRAWINGS

The above and other objects, features and advantages of the present invention will be more apparent from the following description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when to used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

Figure 1:
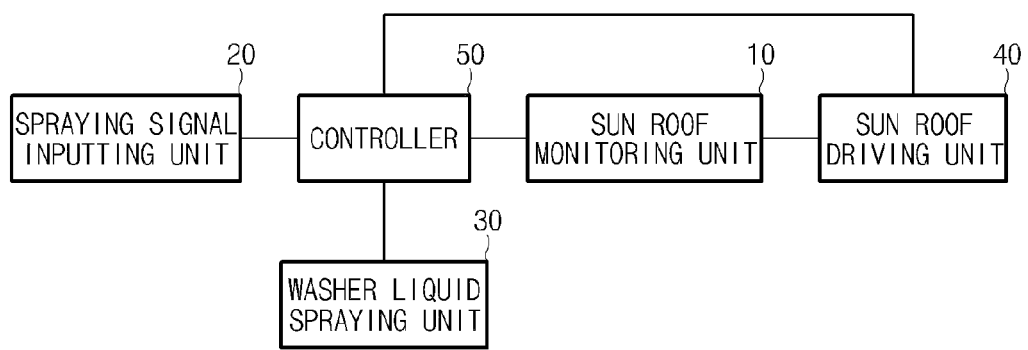
FIG. 1 is an exemplary configuration diagram of a washer liquid spraying apparatus of a vehicle according to an exemplary embodiment of the present invention.

FIG. 1 is an exemplary configuration diagram of a washer liquid spraying apparatus of a vehicle according to an exemplary embodiment of the present invention.

As shown in FIG. 1, the washer liquid spraying apparatus of a vehicle according to the exemplary embodiment of the present invention may be configured to include a plurality of units executed by a controller 50. The plurality of units may include a sun roof monitoring unit 10, a spraying signal inputting unit 20, a washer liquid spraying unit 30, a sun roof driving unit 40.

The above-mentioned respective components will be described below. The sun roof monitoring unit 10, which may be a type of sensing sensor, periodically monitors an operation state of a sun roof mounted in the vehicle. In other words, the sun roof monitoring unit 10 monitors when the sun roof is opened and closed.

Additionally, the spraying signal inputting unit 20 may be a switch mounted in the vicinity of a steering wheel of the vehicle and may receive a spraying signal from a driver, instructing a washer liquid to be sprayed. A multi-function switch may be used as the spraying signal inputting unit 20.

Further, the washer liquid spraying unit 30 may spray the washer liquid or may cease to spray the washer liquid according to a control signal of the controller 50 and may control pressure of the sprayed washer liquid. The washer liquid spraying unit 30 may control the pressure of the sprayed washer liquid by turning a washer liquid spraying motor on or off based on a washer liquid spraying-on signal and a washer liquid spraying-off signal alternately transferred from the controller 50. Thus, a revolution per minute (RPM) of the washer liquid spraying motor periodically turned on or off may be lowered to control pressure of the sprayed washer liquid.

In addition, the sun roof driving unit 40, which may be a module opening or closing the sun roof mounted in the vehicle, may include a driving driver and a driving motor. The sun roof driving unit 40 may close or open the sun roof according to a received a driving signal from the controller 50.

Moreover, the controller 50 may control the washer liquid spraying unit 30 to execute the spray of the washer liquid in proportion to a time in which the spraying signal is input through the spraying signal inputting unit 20. That is, the controller 50 may control the washer liquid spraying unit 30 to spray the washer liquid during the time in which the spraying signal is input through the spraying signal inputting unit 20. The controller 50 may alternately transfer the washer liquid spraying-on signal and the washer liquid spraying-off signal to the washer liquid spraying unit 30 when the sun roof is opened, thereby controlling the pressure of the sprayed washer liquid. However, since the controller 50 may only transfer the washer liquid spraying-on signal to the washer liquid spraying unit 30 when the sun roof is closed, it may not control the pressure of the sprayed washer liquid.

In addition, the controller 50 may alternately transfer the washer liquid spraying-on signal and the washer liquid spraying-off signal to the washer liquid spraying unit 30 when the sun roof is opened, thereby reducing the pressure of the sprayed washer liquid and then controlling the sun roof driving unit 40 to close the opened sun roof. The controller 50 may only transfer the washer liquid spraying-on signal to the washer liquid spraying unit 30 when the sun roof is closed, thereby returning the pressure of the sprayed washer liquid to an original state.

Figure 2:
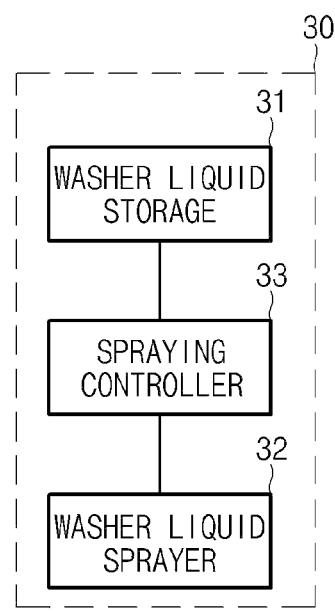
FIG. 2 is an exemplary detailed configuration diagram of a washer liquid spraying unit according to the exemplary embodiment of the present invention.

FIG. 2 is an exemplary detailed configuration diagram of a washer liquid spraying unit according to the exemplary embodiment of the present invention.

As shown in FIG. 2, the washer liquid spraying unit according to the exemplary embodiment of the present invention may be configured to include a washer liquid storage 31, a washer liquid sprayer 32, and a spraying controller 33.

The washer liquid storage 31, which may be a type of storing tank, may store a washer liquid therein. The washer liquid sprayer 32, which may be a motor spraying the washer liquid, may spray the washer liquid stored in the washer liquid storage 31 to a wind shield glass. The spraying controller 33 may control the washer liquid sprayer 32 to spray the washer liquid to correspond to the control of the controller 50.

In other words, the spraying controller 33 may turn the washer liquid sprayer 32 on or off when it receives the washer liquid spraying-on signal and the washer liquid spraying-off signal from the controller 50, thereby controlling the pressure of the sprayed washer liquid.

Figure 3:
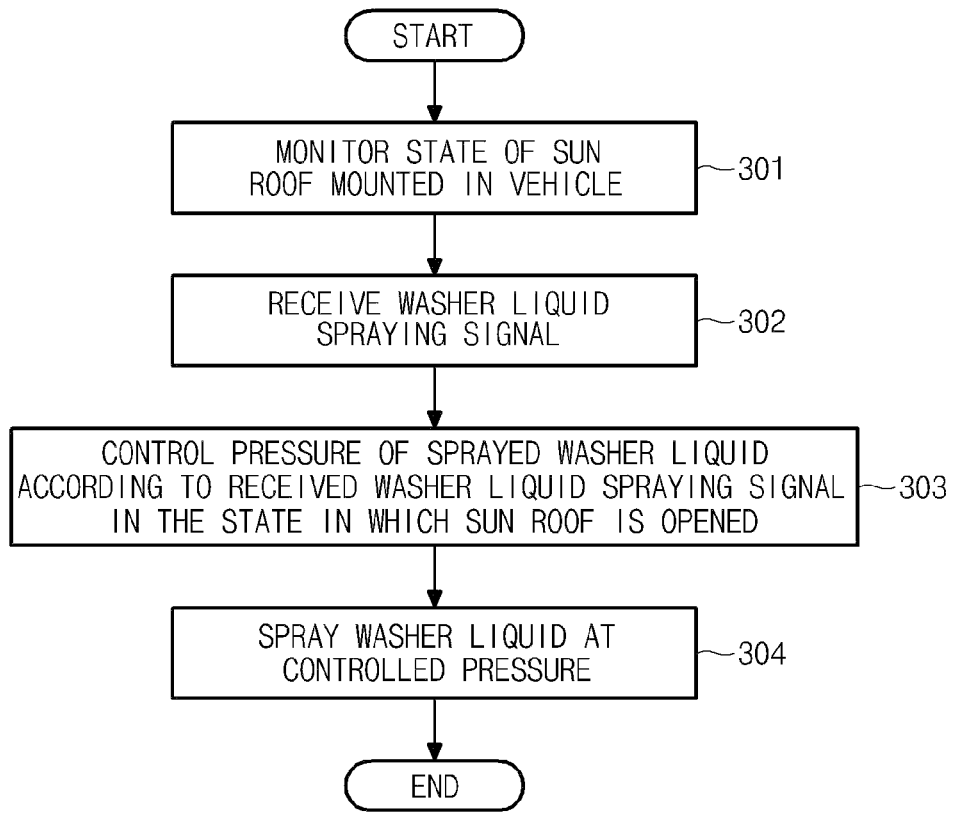
FIG. 3 is an exemplary flow chart of a washer liquid spraying method of a vehicle according to the exemplary embodiment of the present invention.

FIG. 3 is an exemplary flow chart of a washer liquid spraying method of a vehicle according to the exemplary embodiment of the present invention.

The sun roof monitoring unit 10, controlled by the controller, monitors a state of the sun roof (e.g., whether the sun roof mounted in the vehicle (301) is open or closed). Further, the spraying signal inputting unit 20, controlled by the controller, receives a washer liquid spraying signal input from a driver (302).

Thereafter, as the sun roof sensing unit 10 confirms that the sun roof is opened, the controller 50 controls the pressure of the washer liquid sprayed by the washer liquid unit 30 (303). Furthermore, the washer liquid spraying unit 30 sprays the washer liquid according to the control of the controller 50 (304).

Through the above-mentioned process, when the washer liquid spraying signal is input indicating an opened sun roof, the pressure of the sprayed washer liquid may be reduced to prevent the washer liquid from spraying into the vehicle through the sun roof. Furthermore, when the sun roof is closed, the reduced pressure of the sprayed washer liquid returns to the original state.

As set forth above, according to the exemplary embodiments of the present invention, when the washer liquid spraying signal is input indicating a closed sun roof, the pressure of the sprayed washer liquid may be reduced, thereby preventing the washer liquid from spraying into the vehicle through the sun roof.

In addition, according to the exemplary embodiments of the present invention, when the washer liquid spraying signal is input indicating an open sun roof, the sun roof may be automatically closed, thereby preventing the washer liquid from spraying into the vehicle through the sun roof.

Further, according to the exemplary embodiments of the present invention, when the washer liquid spraying signal is input indicating a closed sun roof is opened, the pressure of the sprayed washer liquid may be reduced, the sun roof may be automatically closed, and the reduced pressure of the sprayed washer liquid may return to the original state when the sun roof is completely closed, thereby preventing the washer liquid from spraying into the vehicle through the sun roof.

The present invention described above may be variously substituted, altered, and modified by those skilled in the art to which the present invention pertains without departing from the scope and sprit of the present invention. Therefore, the present invention is not limited to the above-mentioned exemplary embodiments and the accompanying drawings.

What is claimed is:

1. A washer liquid spraying method of a vehicle, comprising:

monitoring, by a controller, a state of a sun roof mounted in the vehicle;

receiving, by the controller, a washer liquid spraying signal input from a driver;

controlling, by a spraying controller of a washer liquid spraying unit, a pressure of a washer liquid sprayed when the sun roof is opened based on a washer liquid spraying-on signal and a washer liquid spraying-off signal alternately received from the controller; and executing, by the washer liquid spraying unit, a spray of the washer liquid according to the pressure of the washer liquid.

2. The washer liquid spraying method according to claim 1, further comprising closing, by the controller, the sun roof when the controller receives the washer liquid spraying signal input indicating the sun roof is opened.

3. The washer liquid spraying method according to claim 2, further comprising only receiving the washer liquid spraying-on signal when the sun roof is closed.

* * * * *